UNITED STATES PATENT OFFICE.

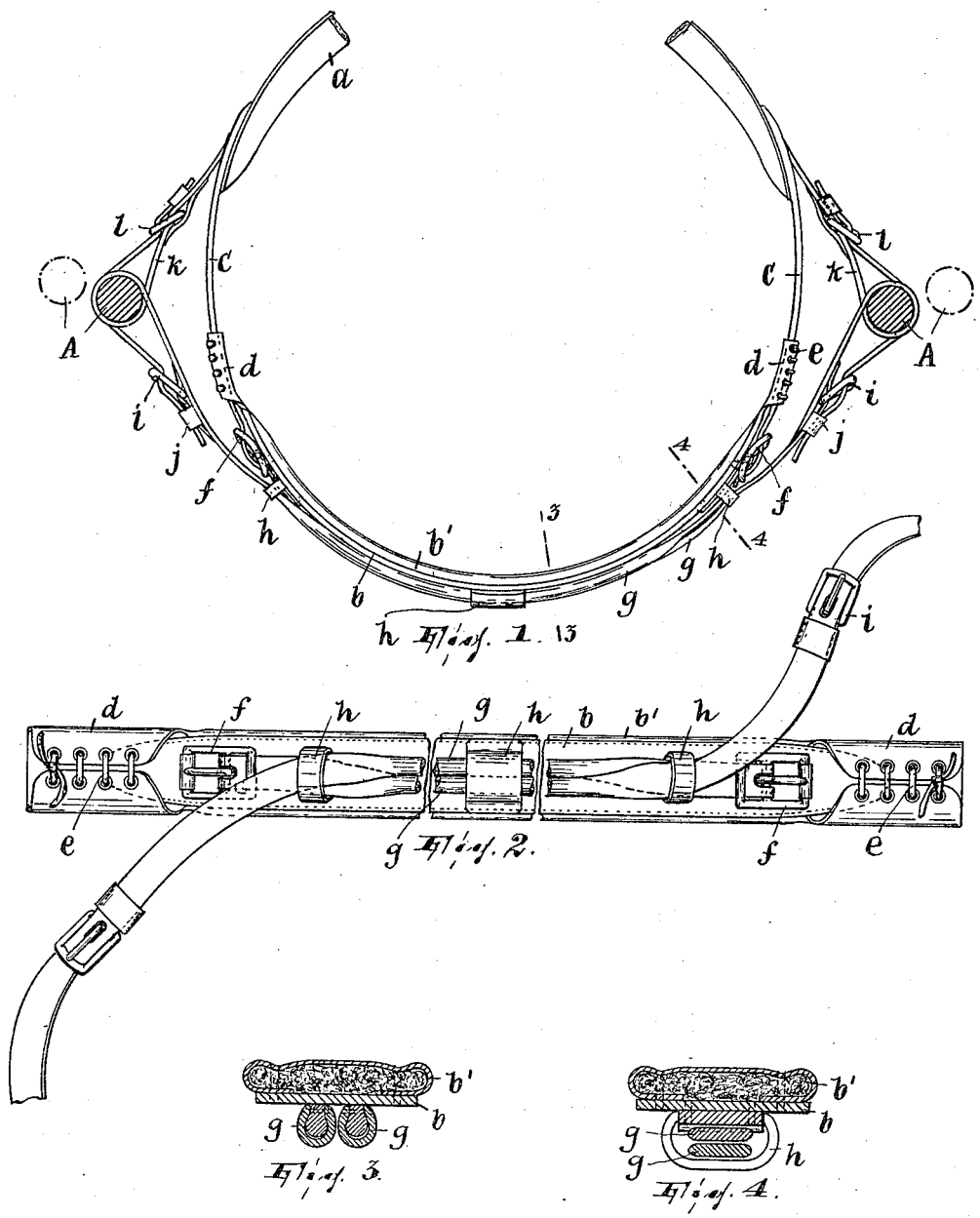

EDWARD MORREY, OF HASKELL, NEW JERSEY.

HARNESS-GIRTH.

1,303,941.   Specification of Letters Patent.   Patented May 20, 1919.

Application filed June 11, 1918. Serial No. 239,358.

*To all whom it may concern:*

Be it known that I, EDWARD MORREY, a citizen of the United States, residing at Haskell, in the county of Passaic and State of New Jersey, have invented certain new and useful Improvements in Harness-Girths, of which the following is a specification.

The object of this invention is to provide a girth for driving harness in which the resistance of the vehicle shafts against being sprung toward each other will be brought into play to maintain the girth under yielding tension about the animal's body. This object I attain by providing a girth having branches forming tug-straps to be attached to the vehicle shafts and having its ends extending sufficiently beyond such branches so that each may be passed under the animal's body and secured, after obtaining the desired degree of cinch, to the relatively opposite shaft. My invention consists in a girth as thus broadly defined but in the preferred form it includes a saddle having saddle straps extending therefrom, tug-straps secured to the saddle and provided with buckles whereby they may be wrapped or looped around and secured to the shafts, extension straps buckled to the saddle straps and a belly-band having suitable means to keep the saddle straps and extension straps in proper working relation to the belly-band.

In the accompanying drawing,

Figure 1 is a front elevation of the improved girth, showing it attached to the shafts, which appear in section;

Fig. 2 is an underneath plan of the belly-band and the extension straps; and

Figs. 3 and 4 are sectional views on the lines 3—3 and 4—4, respectively, of Fig. 1.

The saddle is designated by *a*. *b* is the belly-band which may be padded, as at *b'*, Figs. 3 and 4, and receives in the loops *d* formed at its ends the saddle straps *c* extending from the ends of the saddle. The loops *d* are formed by lateral extensions of the belly-band *b* which are rebent and joined by lacing *e*.

By means of buckles *f* attached to the ends of the saddle straps, extension straps *g* are secured to the saddle straps, each of these being provided more or less near the free end thereof with a buckle *i* and an adjoining loop *j*. These extension straps are crossed under the belly-band as shown best in Fig. 2, and passed through guiding loops *h* on the belly-band. The free ends of the extension straps are adapted to be wound one or more times around the shafts and then secured to the buckles *i*. The saddle *c* has attached to its branches straps forming the tugs or tug-straps *k* and each of these has a buckle *l* whereby, after it has been wrapped one or more times around the corresponding shaft, the end of such strap may be secured.

My invention broadly consisting, as already stated, in a girth having branches forming tug-straps, as *k*, to be attached to the vehicle shafts and having its ends, as *c—g*, extending beyond the branches and adapted to cross each other under the animal's body, and then be secured each to the relatively opposite shaft, it will be apparent that, assuming that the normal relative positions of the vehicle shafts are those indicated by the dotted lines in Fig. 1, when the girth has been properly placed upon the animal's back and the tug-straps made to receive the shafts, and then the ends of the extension straps *g* are, in the act of wrapping them around the shafts and securing them, made to spring the shafts more or less into the full line position shown in Fig. 1, the result will be that the animal's body will be subjected to yielding tension, always desirable in a girth.

It being of course desirable to provide an element, such as the belly-band, to afford a bearing for the crossed extension straps *g* and to preserve the said straps in operative relation to the belly-band, as by the loops *h*, it will be understood that in the present instance the buckles *f* are provided so that the girth may be applied to or removed from the animal without withdrawing one of the extension straps from the loops *h*.

I do not wish to be limited to the exact construction herein shown for the purpose of illustration, what I claim being:

1. A harness girth having branches forming tug-straps adapted to be secured to the shafts of a vehicle and having its ends extended beyond the branches and crossed under the animal's body and then each secured to the relatively opposite shaft.

2. A harness girth having branches forming tug-straps adapted to be secured to the shafts of a vehicle and having its ends extended beyond the branches and crossed under the animal's body and then each secured to the relatively opposite shaft, in combination with a belly-band arranged at the inner sides of and having means to confine the crossed girth-ends to longitudinal movement relatively thereto.

In testimony whereof I affix my signature.

EDWARD MORREY.

Copies of this patent may be obtained for five cents each, by addressing the "Commissioner of Patents, Washington, D. C."